Nov. 22, 1960   H. G. G. BROWN   2,960,865
MEASUREMENT OF TACK
Filed May 22, 1958
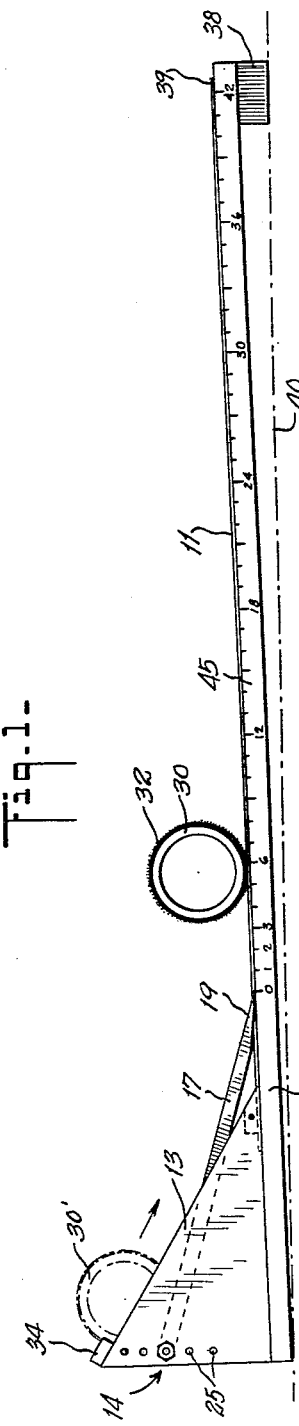
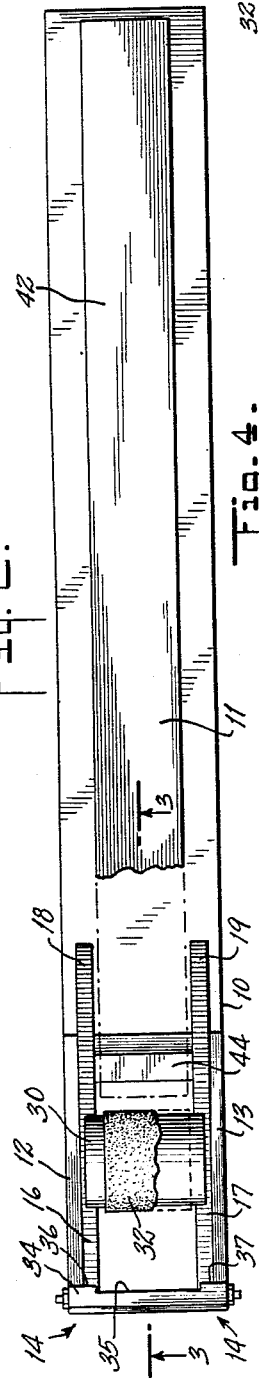
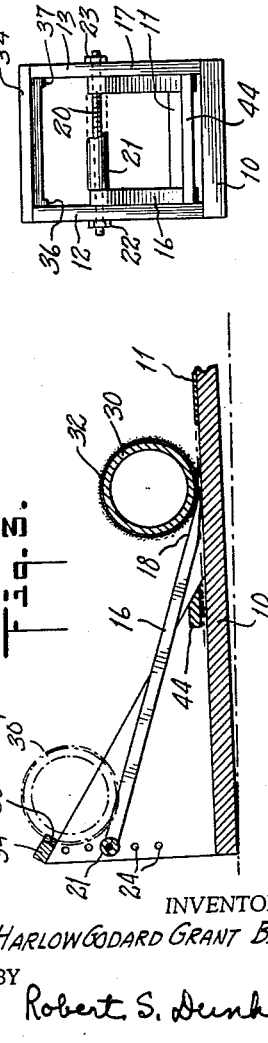
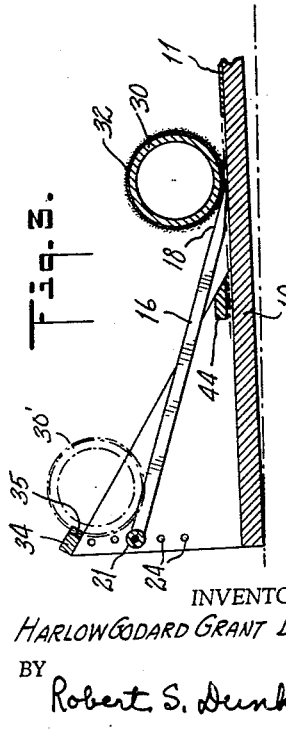
INVENTOR.
HARLOW GODARD GRANT BROWN
BY
Robert S. Dunham
ATTORNEY United States Patent Office 2,960,865
Patented Nov. 22, 1960

2,960,865

MEASUREMENT OF TACK

Harlow Godard Grant Brown, Mobile, Ala., assignor to Cordo Chemical Corporation, Norwalk, Conn., a corporation of Connecticut Filed May 22, 1958, Ser. No. 737,156

8 Claims. (Cl. 73—150)

This invention relates to apparatus and procedure for measuring the tack of sheet material having a tacky surface, the new and improved apparatus herein disclosed being a device which can be appropriately called a tack meter.

It may be explained that for various uses, sheet materials, including materials produced in strip or ribbon form, are manufactured with tacky or sticky surfaces, of which advantage is to be taken in later adhering such materials to other surfaces, structures or members, or in adhering the materials together or to other fabric or sheet as in building up laminated fabrics or compositions.

For example, fabrics or similar flexible sheet material made of woven, felted or matted fibers and coated or impregnated with uncured or partly cured resin compositions are often produced to have a tacky surface on one or both sides, constituted by the synthetic resin or similar substance, e.g. as instanced by polyester resins, and other monomeric or polymeric compositions. Such fabric, sold as an article of commerce, can be utilized in various ways, for example in preparing various shaped articles or structures or rigid sheets or plates as by laying up the tacky fabric or pieces of it upon suitable beds, molds or forms, whereupon the material is ultimately cured or otherwise treated to constitute a more or less rigid shell or similar shaped or sheet-like object. The tacky character of the unfinished sheet material manufactured for such use is an important characteristic, and proper control of production as well as proper compliance with requirements of users, necessitates some way of determining the degree of tack or tackiness in successive lots of the material. Similar requirements, of course, occur with other products such as sheets, strips or tapes of paper, cloth, cellulose film and the like, carrying a coating of pressure-sensitive adhesive material which is required to exhibit a certain extent of tack or stickiness.

Important objects of the present invention are therefore to provide improved apparatus and procedure for measuring the tack of sheet material, as of the character described, wherein consistently significant values can be determined and wherein a relatively high order of sensitivity is obtainable, as well as reliability and adaptability to various kinds and conditions of materials to be tested. Further objects are the provision of unusual simplicity of structure and convenience of use, as in providing a tack meter which will afford a rapid and accurate reading and which may be employed without any special skill or technical knowledge.

To these and other ends, the apparatus of the invention, especially as embodied in the form hereinbelow described, comprises roller means, such as a simple cylindrical body having a peripheral roller surface upon which a piece of the sheet material may be mounted, so as to expose the tacky side which to be tested. Means are provided to receive the roller means and accelerate it to a predetermined extent, such means being arranged to engage the roller means at localities other than the surface region occupied by the material under test. Finally, the device includes a pathway disposed to receive the moving roller means in its accelerated condition, for free rolling motion along the path with the tacky surface of the material in bearing relation to the path.

Involving further and more specific features of improvement, a presently preferred form of the tack meter embraces a simple cylindrical element as the roller means, with a strip of the sheet material wrapped about a central portion of its surface, while end portions of such surface constitute bearing means engageable for the above-described accelerating operation. The means for imparting kinetic energy of rolling motion to the material-bearing element are constituted by an inclined track, consisting of a pair of rails spaced to receive the roller at its material-free end portions. At its lower end the track meets an extended pathway, which may comprise a plane surface of suitable length, preferably having a slight upward incline from its roller-receiving end. A scale is placed along the path, conveniently at one side, for measuring the distance traveled by the roller.

As will now be seen, the procedure involves applying a piece of the material to be tested to the cylindrical roller surface, accelerating the roller body, as by releasing it at the upper end of the inclined rails, so that it reaches a predetermined rolling velocity at the lower end of the rails, and continuing the rolling motion of the element along the free path, with the tacky surface of the material in rolling bearing relation to the path surface. Thus the adhering effect of the tackiness of the material on the pathway decelerates the rolling body until it comes to rest, the distance traveled along the path being then measured as bearing an inverse relation to the degree of tackiness. That is to say, the progress of the roller or cylinder along the free path, or more specifically up the relatively small incline of such path, is impeded by the tackiness of the material under test. The distance traveled by the cylinder is inversely proportional to the tackiness and may consequently be measured to afford a reading of the degree of tack.

The convenience and simplicity of the operation should be evident from the foregoing explanation, in that the manipulative steps are merely to affix the piece of material to the drum or roller and to insert the latter in the apparatus, for example by releasing it at the upper end of the inclined track. A particular feature is that the roller or drum is brought to a predetermined velocity, i.e. a velocity which is uniform for all tests, whereupon it is allowed to roll, under this uniform amount of kinetic energy alone, along a fixed path. The decelerating effect of the tacky surface is directly reflected by the distance which the roller travels before it comes to rest, thus affording, by the described inverse relationship, a simple and unusually accurate measure of the degree of tack or stickiness.

By way of example, an embodiment of the improved tack meter is shown in the accompanying drawing where, with some parts in certain views partly broken away for clarity, the several figures are as follows:

Fig. 1 is a side elevation of the device;

Fig. 2 is a plan view;

Fig. 3 is a vertical, longitudinal section on line 3—3 of Fig. 2;

Fig. 4 is an end elevation, i.e. as seen at the left-hand end of Fig. 1; and

Fig. 5 is a perspective view of the roller element, with a piece of material to be tested, in course of being wrapped into place.

Referring to the drawings and bearing in mind that other forms, shapes and arrangements of structural parts may be used, it will be seen that the apparatus includes an elongated base plate or member 10, which may have an upper, plane surface and thus constitute, at its region 11, the path for free rolling of the drum or roller element. A pair of transversely spaced upright plates 12, 13 are mounted on the base 10, extending respectively adjacent the sides thereof and being positioned at one end of the apparatus, as shown.

These plates 12, 13, which may be triangular in shape, rising to a maximum height at their end edges 14, are provided to support a corresponding pair of rails 16, 17, disposed respectively adjacent the plates. The rails slope downward, as shown, from the region of the end plate edges 14, to constitute an inclined track. As illustrated, the forward ends 18, 19 of the rails 16, 17 are appropriately mitered in a narrow angle, across their under surfaces, so that the upper, plane faces of the rails precisely meet the plane surface of the path 11. The rails are secured in place by any appropriate means, for instance as with a long threaded rod 20 carrying a spacing sleeve 21 between the rails, the rod 20 extending through holes in the respective rails 16, 17 and the correspondingly adjacent plates 12, 13, to be secured by nuts 22, 23 at the outer faces of the plates. If desired, means may be provided for adjusting the inclination of track, e.g. as to accommodate the device to measure different ranges of tackiness, it being understood that ordinarily a single adjusted position of the rails should be maintained for any set of measurements that are to be compared with each other. Thus for instance, one means for adjustably positioning the rails may comprise the illustrated structure of the plates 12, 13 with a multiplicity of holes 24, 25 into which the supporting rod 20 may be selectively disposed.

The test roller or drum consists of a simple cylinder 30, which may be hollow as shown and which has an axial length approximately equal to the total width of the track constituted by the rails 16, 17. In the specific device shown, the length of the roller is slightly less than the spacing between the plates 12, 13, i.e. so that it will have sufficient clearance from them to insure free rolling; it is greatly preferable that the roller touch nothing but the rails as it rolls downward. The central portion of the outer cylindrical surface of the roller 30 constitutes means for receiving the material to be tested, e.g. a strip 32, conveniently of such length that it can be wrapped snugly about the cylindrer with its ends meeting or (if desired) overlapping. The width of the test strip is less than the distance between the inner edges of the rails 16, 17, preferably by an appreciable amount so that the wrapped strip fully clears the rails when the roller is disposed on them as at 30′ in Figs. 1 and 3 and also as shown in Fig. 2. Thus the outer portions of the cylindrical roller surface, i.e. adjacent their ends, constitute bearing surfaces to be respectively engaged by the rails.

For accuracy in placing the roller 30 in starting position, a transverse block or stop 34 is mounted on the plates 12, 13, in bridging relation to the track near the end plate edges 14. If desired the stop member 34 may have a recessed region 35 in its forward edge, so that only outer portions 36, 37 thereof are arranged to be abutted by the surface of the roller 30, viz. the track-bearing regions of the latter.

In a preferred structure, to avoid requirement of an unduly long rolling path 11 for certain ranges of tackiness, the path is inclined upward from the juncture with the track 16, 17. Such upward incline may be effected, for example, by a support block or foot 38 under the remote end 39 of the base member 10. With this specific structure, it will be appreciated that the angular disposition of the rails 16, 17 relative to the base 10 is appropriately selected to afford a desired angle with the true horizontal (such as represented by the table or other supporting surface 40 upon which the apparatus rests) as may be desired to obtain a suitable rolling velocity of the cylinder 30 at the foot of the track section.

Although for many purposes the upper path surface 11 of the base 10 upon which the tacky surface of the material 32 is to roll, may consist simply of the bare material of the base member, e.g. steel or other metal, or wood, fiber composition, plastic or the like, special convenience is sometimes served by providing a removable surface material such as a long sheet of paper 42, overlying the path portion 11 of the base 10. The forward end of this long strip of paper or other suitable material may be received and retained beneath a bracing member 44 which is mounted between the plates 12, 13, in slight clearance above the base 10, and at an appropriate locality, e.g. as shown, below the rails 16, 17. If desired, the paper strip can be fastened in place, as by temporary adhesive in the vicinity of its left-hand end as seen in Figs. 1–3.

For numerical measurement of the degree of tack of material carried by the roller 30, a scale 45 can be disposed along the path 11, for example as shown on the side wall of the base 10. The position at which the roller comes to rest may be easily read as the point of tangency. While for simplicity the scale is shown as graduated in simple units of distance from the foot of the track 16, 17, it will be appreciated that if desired, other units representing degree of tack may be selected and employed, the value of tackiness bearing a readily determinable and reproducible relation, of inverse nature, to the travel distance on the inclined path.

The operation of measuring tackiness, as with the meter shown in the drawings, will now be readily understood. An appropriate length 32 of the material to be tested is secured around the roller 30 (Fig. 5), being cut in width as described above and being preferably dimensioned in length to surround fully the periphery of the roller. When the strip of material is relatively thin, its ends may be overlapped, if desired, for better retention on the roller. The end portions of the roller are left bare, as explained. If the sheet material is tacky on both surfaces, the sticky character of its inner face will suffice to hold it on the roller. With materials having only one tacky side, the adherence to the roller may be provided in other ways, as by appropriate application of temporary adhesive in suitable localities.

The centrally-covered roller is then disposed at the upper end of the track 16, 17, so that its end portions abut the regions 36, 37 of the stop. Thus in the position 30′, the cylinder is simply released, rolling down the track and being accelerated, by gravity, to a predetermined velocity, uniform for every test, as it reaches the juncture of the track with the inclined plane 11. Having at this point acquired a correspondingly predetermined or constant amount of kinetic energy, it rolls free along the path, i.e. with the tacky surface of the material 32 in rolling, bearing relation. The tackiness decelerates the roller, i.e. to a further extent than the effect of gravity and other normal retarding factors which are uniform for all tests, with the result that the roller 30, traveling as shown in Fig. 1, comes to rest at a particular point. The distance of this point from a suitable zero locality (such as the end of the track 16, 17) is then read as a measure of tackiness. Subsequent readings, for example, of other specimens of similar material, made in exactly the same way, will yield distance values which vary in accordance with variations of tack, the distance of free roll having an inverse relation to the tackiness. In most cases the tackiness of the material will keep the cylinder from rolling back after it has come to a halt, but even where the material has so little tack that the roller does move back on the inclined path 11, there is no difficulty in making a significant reading at its furthest point of travel.

As explained, the path 11 may be covered with suitable surface material such as the sheet of paper 42, which is preferably replaced for each test and which of course should have the same surface characteristics for all tests that are to be compared. The paper is of special value where the material under test may leave portions of its tack-producing composition as it rolls along the free path; with a fresh surface for each test, such deposited particles or amounts of tacky substance cannot affect the accuracy of successive determinations.

While the apparatus may be made in a variety of shapes and sizes, with angles of track incline and with disposition of the free path, either horizontally or at an upward angle or even in some instances slightly downward, as may be specifically required for special ranges of tackiness, the following dimensional characteristics illustrate one presently preferred embodiment of apparatus, suitable for measuring tack of resin-impregnated fabric sheet material of the kind described above. In such device the rails 16, 17 had a length of approximately 1 foot and were set about 4 inches apart (between their inner edges) at an angle to the true horizontal of approximately 15°. The plane of the free path 11 was disposed at an angle of about 5° to the true horizontal, i.e. thus inclined slightly upward from the point of intersection with the rails. The roller or drum 30 consisted of a hollow cylinder approximately 5 inches in outside diameter and 5 inches long, and having a wall thickness of 1/16 inch. Although the several parts can be made of a variety of materials, such as wood, plastic or other compositions, the roller, rails and base 10 were conveniently made of metal, e.g. steel, having appropriately smooth surfaces. The strips of material to be tested were cut 3½ inches wide, thereby leaving abundant clearance at each end of the cylinder 30 for non-adhesive engagement with the rails. Apparatus designed as shown and embodying these characteristics and measurements has been found highly effective in making tack measurements, with remarkably consistent results.

It is to be understood that the invention may be embodied in other forms without departure from its spirit.

I claim:

1. Apparatus for measuring the tack of sheet material having a tacky surface, comprising roller means having a peripheral roller surface adapted to hold a piece of said material with the tacky surface exposed, means including track means to receive the roller means at localities thereof other than the locality of said piece of material, for accelerating said roller means to a predetermined velocity, and means providing a path disposed to receive the roller means from the track means, for free rolling motion of said roller means upon the tacky surface of the aforesaid material and along the path to a distance determined by the tack of the material.

2. Apparatus for measuring the tack of sheet material having a tacky surface, comprising roller means having a peripheral roller surface region adapted to hold a piece of said material with the tacky surface exposed, said roller means having bearing means disposed outside the aforesaid peripheral surface region thereof, inclined structure adapted to receive said roller means in rolling relation of the bearing means thereof upon said structure, for accelerating said roller means to a predetermined velocity at the foot of said structure, and means providing a path extending from the foot of the aforesaid structure, to receive the roller means from said structure for free rolling motion of said roller means upon the tacky surface of the aforesaid material and along the path to a distance determined by the tack of the material.

3. Apparatus as defined in claim 2, wherein the bearing means comprises structure at each end of the peripheral material-receiving surface region, constituting a cylindrical bearing surface at each end of the roller means, and wherein the aforesaid inclined structure comprises a pair of inclined laterally spaced coplanar rail members respectively disposed to receive the aforesaid cylindrical bearing surfaces of the roller means.

4. Apparatus as defined in claim 3, wherein the path-providing means comprises an elongated plane-surfaced structure extending from the foot of the said rails and having an inclination upward from said foot, said inclination being substantially smaller, relative to the horizontal, than the inclination of the rails.

5. Apparatus as defined in claim 2, which includes a scale disposed along the path-providing means to indicate the distance traveled by the roller means thereon.

6. Apparatus for measuring the tack of sheet material having a tacky surface, comprising roller means having a cylindrical surface adapted to hold a piece of said material wrapped around it with the tacky surface exposed, means engaging said roller means at localities thereof other than the locality of said piece of material, for accelerating said roller means to a predetermined rotational velocity, and means providing a path for free rolling motion of said roller means upon the tacky surface of the aforesaid material and along the path to a distance determined by the tack of the material, said accelerating means being arranged to deliver the roller means, with said rotational velocity, upon one end of said path.

7. Apparatus for measuring the tack of sheet material having a tacky surface, comprising a cylindrical roller adapted to hold a piece of said material wrapped around a central portion of the roller with the tacky surface exposed, and with end portions of the roller uncovered to constitute bearing means, an inclined track adapted to receive said bearing means portions of the roller, for accelerating said roller to a predetermined rolling velocity at the foot of the track, and plane-surfaced structure extending from the foot of the track, to receive the accelerated roller for free rolling motion thereof upon the tacky surface of the aforesaid material and along the plane surface to a distance determined by the tack of the material.

8. Apparatus as defined in claim 7, wherein the plane-surfaced structure is disposed with an inclination upward from the foot of the track, said inclination being substantially smaller, relative to the horizontal, than the inclination of the track, and said apparatus including scale means along said plane-surfaced structure to indicate the distance traveled by the roller thereon.

References Cited in the file of this patent

UNITED STATES PATENTS 2,390,510   Chatten _____ Dec. 11, 1945

FOREIGN PATENTS 836,686   France _____ Oct. 25, 1938

OTHER REFERENCES

Journal of Applied Physics, vol. 27, No. 11, November 1956. Article by J. R. Jenness, Jr., pp. 1371–1373.